Patented June 20, 1933

1,915,085

UNITED STATES PATENT OFFICE

BOZETECH C. BREN, OF ARLINGTON, NEW JERSEY, ASSIGNOR TO DU PONT VISCOLOID COMPANY, OF WILMINGTON, DELAWARE, A CORPORATION OF DELAWARE

SAFETY GLASS

No Drawing.  Application filed September 22, 1930. Serial No. 483,765.

This invention relates to safety glass, that is, glass in which the pane is made up of glass proper and a strengthening layer of a suitable, somewhat flexible material, such as cellulose ester plastic, e. g. cellulose nitrate or cellulose acetate plastic, attached to the glass, to prevent shattering and splintering of the glass. In such composites or sandwiches, as ordinarily produced, one of the difficulties that must be provided against is the swelling of the plastic sheet at its edges, and the consequent separation of the composite at its edges, due to the absorption, by the plastic sheet, of atmospheric moisture. A commonly proposed remedy for this difficulty, is the luting of the edges of the composite with various materials, such as pitch, etc.; but the complications of manufacture introduced when luting is practiced, as well as various other drawbacks, make highly desirable the provision of a safety glass which, although luting or other operations really extraneous to the manufacture of safety glass composites as such, are eliminated, shall yet be free from the fault of edge separation due to moisture absorption. I have devised a safety glass which, although it need not embody luting, or similar expedients, is yet free from the mentioned fault of edge separation.

One object of the invention is to provide a safety glass highly resistant to separations between its laminations, due to moisture absorption. A further object is to provide a safety glass embodying a plastic layer which is, of itself, highly moisture resistant. A further object is to provide a safety glass whose plastic component, while retaining certain of the advantages incident to a base of cellulose ester, e. g. cellulose nitrate or acetate, shall be highly resistant to the absorption of moisture. To these ends, and also to improve generally on safety glass, the invention consists in the various matters hereinafter described and claimed.

In accordance with the invention there is used in the safety glass a component, e. g. a central strengthening plastic layer, comprising, as a basic component of the plastic, a mixture of cellulose ester or esters, and cellulose ether or ethers. While cellulose acetate of the usual plastics type (acetone soluble) absorbs from 6% to 9% of water, and while cellulose nitrate of the usual plastic type (11% nitrogen) absorbs about 4% of water, the absorption by the corresponding plastics being not materially different from the mentioned percentages—and absorptions as high as this are greatly conducive to the separation difficulties discussed above—safety glass with an ester-ether plastic component, as indicated, is practically free from the water absorption difficulty. For example, an ester-ether plastic having a mixture of 60 parts (by weight) of nitrocellulose and 40 parts of benzyl cellulose has a moisture absorption factor of, say, 3% or below, eliminating, for practical purposes the moisture-absorption factor.

A suitable formula for the plastic may be (parts by weight);

| | | Preferred |
|---|---|---|
| Cellulose ester | 9 to 64 | 52 |
| Cellulose ether | 82 to 7 | 26 |
| Plasticizer | 9 to 29 | 22 |

That is, as appears from the above formula (given by way of illustration merely and not by way of limitation) the cellulose ether content of the plastic may desirably be varied between 10% and 90% of the ester-ether mixture, and it is preferable that the ether be about 33% of the ester-ether mixture. As appears, as the cellulose ether content is increased, the plasticizer content may be reduced in consideration of the superior flowability of ethers as compared to the esters. The plasticizer may be any one suitable for the esters and ethers in the mixture, and in view of the desideratum of resistance of the plastic to moisture absorption the plasticizer is desirably one such as camphor, dibenzyl ether, ethyl acetanilide, ethyl paratoluene sulphonamide, dimethyl phthalate and so forth, not absorbing moisture. However, in view of the water resistance of the cellulose ether component, water-absorbent plasticizers, such as triacetine may be used in increasing amounts as the cellulose ether content is increased, without necessarily rendering the plastic not sufficiently waterproof.

In making up the plastic, the ingredients may be combined, colloided, and made into sheeting, in accordance with the usual practices of the art. For example, the ingredients may be macerated and kneaded in a dough mixer with a suitable quantity of volatile solvent, or solvent mixture, for example ethyl acetate alone or a mixture of ethyl alcohol and benzol, until proper colloiding is effected, this being followed by the steps of filtering, rolling, pressing and sheeting. As will be understood, for the sake of simplicity, in the above formula the volatile solvent content is omitted but it would ordinarily amount to about 2 parts by weight in the finished stock.

In the formula, as a specific example merely, the cellulose ester may be taken as cellulose nitrate, the cellulose ether as benzyl cellulose (preferably a dibenzyl cellulose) and the plasticizer as dimethyl phthalate. The cellulose ester content may be nitrate or acetate; the cellulose ether content may be any of the cellulose ethers hereinafter specifically discussed, or a mixture of any of them in any desired proportion, the dimethyl phthalate being retained for any of these cases, or being replaced by a like quantity of any other plasticizer compatible with the cellulose ester, and the various cellulose ethers hereinafter referred to.

The cellulose ether is preferably an alkyl ether, say alphyl or aryl. (These terms are herein used in accordance with the terminology suggested in Bernthsen, Organic Chemistry, Van Nostrand, 1925, page 390, note, "alkyl" referring to monovalent radicals whether aliphatic or aromatic, "alphyl" referring to aliphatic alkyl radicals, and "aryl" referring to aromatic alkyl radicals.) Also the ether may be an aryl-alphyl ether, e. g. ethyl benzyl cellulose. In consideration of the feature of waterproofness, the alphyl ethers having four or more carbon atoms in the alphyl radical are preferable, such as butyl cellulose and amyl cellulose, and so on up the series, although in cases where water absorption need not be reduced to an absolute minimum, methyl cellulose, ethyl cellulose and propyl cellulose may be used, these, although not having a high degree of waterproofness, still having the advantage of increasing the thermo plasticity of the plastic. The aryl ethers to be used should desirably be benzyl ether, tolyl ether and so on up the series. However, in consideration of the desirability of using cellulose ethers, for compounding with the cellulose esters, ethers that are soluble in usual solvents, which are common solvents for cellulose ethers and cellulose esters, are best selected. For example, it is preferable to use alphyl ethers such as butyl ether and amyl ether, which are not only waterproof, but also soluble in ethyl acetate, and in a mixture of (parts by weight) benzol 60 to 80 and alcohol 40 to 20; and benzyl or tolyl cellulose which are soluble in ethyl acetate and in benzol-alcohol.

Safety glass embodying the present invention may be composited in accordance with the usual practices of the art, e. g. under heat and pressure and with or without the use of an adhesive. While the usual safety glass composite embodies but two glasses and an interposed cellulosic strengthening sheet, it will be understood that the invention may be embodied in more complicated composites embodying any desired number of glass and plastic layers. Also, while the formulas given are for transparent plastic, it will be understood that suitable pigments, dyestuffs, and loading materials may be introduced into the plastic without departure from the invention, in cases where transparency and/or water-whiteness is not a feature that need be considered. While the invention is preferably embodied in a safety glass having the described ester-ether cellulosic plastic embodied as a strengthening sheet, it will be understood that such plastic may be used as an adhesive layer in the sandwich together with a cellulosic strengthening sheet of the described ester-ether composition, or of other materials as cellulose acetate plastic, cellulose nitrate plastic, cellulose ether plastic, and so on. While the use of sheeted ester-ether cellulosic plastic has been particularly referred to, it will be understood that the ester-ether plastic layer may be embodied in the sandwich by the depositing of a suitable solution, as by spraying, such solution being made up in substantial accordance with the formulas heretofore suggested, except for the use of a sufficient amount of volatile solvent to give a solution which can be readily handled. The use of such a solution may be found particularly desirable when it is intended to use the ester-ether composition as an adhesive layer, deposited either on the glasses, or on the strengthening sheet, or on both.

I claim:—

1. As a new article of manufacture, a sheet of laminated glass including a quantity of a mechanical mixture of cellulose ester and cellulose ether.

2. As a new article of manufacture, a sheet of laminated glass including a quantity of a substantially water-proof mechanical mixture of cellulose ester and an alphyl ether having four or more carbon atoms in the alphyl radical.

3. As a new article of manufacture, a sheet of laminated glass including a quantity of a substantially water-proof mechanical mixture of cellulose ester and cellulose ether of the aryl series and one of those from benzyl ether upward in the series.

4. As a new article of manufacture, a sneet of laminated glass including a quantity of a mechanical mixture of cellulose ester and cellulose ether, the ether content of the ester-ether mixture being substantially between 10% to 90% of the mixture.

5. As a new article of manufacture, a sheet of laminated glass including a quantity of a mechanical mixture of cellulose ester and cellulose ether, the ether content of the ester-ether mixture being about 33% of the mixture.

6. As a new article of manufacture, a sheet of laminated glass including a layer of a mechanical mixture of plasticized cellulose ester and a plasticized cellulose ether.

7. As a new article of manufacture, a sheet of laminated glass comprising a pair of glasses and, between the glasses and adherent thereto, a strengthening sheet comprising a mechanical mixture of cellulose ester plastic and benzyl cellulose plastic.

8. A composite plate comprising two sheets of glass with an interposed sheet of cellulosic plastic of water repelling composition adherent to the opposed faces of the glass sheets, such cellulosic plastic comprising pyroxylin as an ingredient thereof.

In testimony whereof, I affix my signature.

BOZETECH C. BREN.